United States Patent
Karne et al.

(10) Patent No.: US 12,554,585 B2
(45) Date of Patent: Feb. 17, 2026

(54) PROACTIVE INPUT-OUTPUT FAILOVER BASED ON PREDICTING OPTICAL TRANSCEIVER MODULE HARDWARE FAILURES IN HOST BUS ADAPTER

(71) Applicant: International Business Machines Corporation, Armonk, NY (US)

(72) Inventors: Vinayak Karne, Hyderabad (IN); Yadagiri Rajaboina, Hyderabad (IN); Phani Kumar V. U. Ayyagari, Hyderabad (IN); Venkateshwar R. Yerravalli, Hyderabad (IN); Samyuktha Pantham, Rajanna Sircilla, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/673,134

(22) Filed: May 23, 2024

(65) Prior Publication Data

US 2025/0363007 A1  Nov. 27, 2025

(51) Int. Cl.
*G06F 11/07* (2006.01)
*G06F 11/14* (2006.01)
*G06F 11/20* (2006.01)

(52) U.S. Cl.
CPC ...... *G06F 11/1423* (2013.01); *G06F 11/0772* (2013.01); *G06F 11/2028* (2013.01)

(58) Field of Classification Search
CPC .......... G06F 11/0772; G06F 11/1423
See application file for complete search history.

(56) References Cited

U.S. PATENT DOCUMENTS

| 7,783,779 B1* | 8/2010 | Scales ................ G06F 9/5077 718/1 |
| 7,930,583 B1* | 4/2011 | Vemuri ................ G06F 11/079 710/316 |
| 9,747,180 B1 | 8/2017 | Fair |
| 10,396,897 B1 | 8/2019 | Malave et al. |
| 11,500,678 B2 | 11/2022 | Sumangala et al. |
| 11,720,369 B2 | 8/2023 | Kanjirathinkal et al. |

(Continued)

OTHER PUBLICATIONS

Broadcom product brief, "Emulex SAN manager", Mar. 2025 (Year: 2025).*

(Continued)

*Primary Examiner* — Michael Maskulinski
(74) *Attorney, Agent, or Firm* — Patterson + Sheridan, LLP (57) ABSTRACT

Method and apparatus for performing proactive input-output (IO) failover based on predicting optical transceiver module hardware failures in a host bus adapter (HBA) are described. An example method includes registering with an HBA to receive a notification that a first path via the HBA is predicted to fail. The notification is based on a set of parameters of an optical transceiver module coupled to the first path. A set of parameters of the optical transceiver module are monitored in accordance with the registration. At least one of the set of parameter is determined to satisfy a predetermined criteria. Responsive to the determination, the notification that the first path via the HBA is predicted to fail is sent, a second path via the HBA for issuing an IO operation is determined, and the IO operation is issued via the second path.

20 Claims, 8 Drawing Sheets

(56) References Cited

U.S. PATENT DOCUMENTS

| | | | | |
|---|---|---|---|---|
| 2012/0039331 | A1* | 2/2012 | Astigarraga | H04L 45/26 370/389 |
| 2018/0189152 | A1* | 7/2018 | B S | G06F 13/426 |
| 2023/0239073 | A1* | 7/2023 | Bharadwaj | H04B 17/354 714/726 |

OTHER PUBLICATIONS

Authors et al., Method and System to Detect Defective SFP Transceiver in a SAN Environment, ip.com, Jan. 31, 2012.
Authors et al., A Method for Reporting Port Status Health Checks Using Multiple Fibre Channel Ports on the Same Physical Machine, ip.com, May 24, 2021.
SNIA, Management Interface for SFP+, Mar. 31, 2021.
SFF Specifications, Retrieved from: https://www.snia.org/technology-communities/sff/specifications, Jun. 15, 2018, 6 pages.

* cited by examiner

| SFP Parameter 510 | Threshold per SFF specification 520 | Threshold Subscription by host 530 |
|---|---|---|
| Temperature | -128 C to +128 C | 90 C |
| Voltage (Vcc) | 0 V to +6.55 V | 5 V |
| TX Bias | 0 mA to 131 mA | 100 mA |
| TX Power | 0 mW to 6.55 mW | 5 mW |
| RX Power | 0 mW to 6.55 mW | 5 mW |

PROACTIVE INPUT-OUTPUT FAILOVER BASED ON PREDICTING OPTICAL TRANSCEIVER MODULE HARDWARE FAILURES IN HOST BUS ADAPTER

BACKGROUND

The present disclosure relates to information processing systems, and more specifically, to performing proactive input-output (or input/output) (IO) failover in such information processing systems.

Host devices can communicate with a storage system over a network via multiple different paths. For example, a host device may include a multipath input-output (MPIO) driver that processes IO operations for delivery from the host device to the storage system over one or more paths. In some cases, when a failure or a timeout occurs for a given path, the MPIO driver may redirect the IO operations to another active path in the host device.

SUMMARY

One embodiment presented in this disclosure is a computer-implemented method. The computer-implemented method generally includes registering with a host bus adapter (HBA) to receive a notification that a first path via the HBA is predicted to fail, wherein the notification is based on a set of parameters of an optical transceiver module coupled to the first path. The computer-implemented method also includes monitoring the set of parameters of the optical transceiver module in accordance with the registration. The computer-implemented method further includes upon determining, based on the monitoring, that at least one of the set of parameters satisfies a predetermined criteria: sending the notification that the first path via the HBA is predicted to fail; determining a second path via the HBA for issuing an input-output (IO) operation, the second path being different from the first path; and issuing the IO operation via the second path.

Another embodiment presented in this disclosure is a computing device. The computing device includes one or more memories collectively storing executable instructions, and one or more processors communicatively coupled to the one or more memories. The one or more processors are collectively configured to execute the executable instructions and cause the computing device to perform an operation. The operation includes registering with a host bus adapter (HBA) to receive a notification that a first path via the HBA is predicted to fail, wherein the notification is based on a set of parameters of an optical transceiver module coupled to the first path. The operation also includes monitoring the set of parameters of the optical transceiver module in accordance with the registration. The operation further includes upon determining, based on the monitoring, that at least one of the set of parameters satisfies a predetermined criteria: sending the notification that the first path via the HBA is predicted to fail; determining a second path via the HBA for issuing an input-output (IO) operation, the second path being different from the first path; and issuing the IO operation via the second path.

Another embodiment presented in this disclosure is a computer-readable storage medium. The computer-readable storage medium has computer-readable program code embodied therewith. The computer-readable program code is collectively executable by one or more computer processors to perform an operation. The operation includes registering with a host bus adapter (HBA) to receive a notification that a first path via the HBA is predicted to fail, wherein the notification is based on a set of parameters of an optical transceiver module coupled to the first path. The operation also includes monitoring the set of parameters of the optical transceiver module in accordance with the registration. The operation further includes upon determining, based on the monitoring, that at least one of the set of parameters satisfies a predetermined criteria: sending the notification that the first path via the HBA is predicted to fail; determining a second path via the HBA for issuing an input-output (IO) operation, the second path being different from the first path; and issuing the IO operation via the second path.

Other embodiments include, without limitation, a computer program product that includes a storage medium having computer-readable program code that enables a processing unit to implement one or more aspects of the disclosed methods as well as a system having a processor, memory, and application programs configured to implement one or more of the disclosed methods.

DETAILED DESCRIPTION

Embodiments herein describe techniques and apparatus for performing proactive IO failover in an information processing system. For example, certain information processing systems may include one or more host devices that communicate with one or more storage systems in a storage access network (SAN). The host device(s) may include one or more hardware host bus adapter (HBA) ports, which are utilized to communicate with the storage system(s) within the SAN. For example, the host device(s) may use a transport protocol, such as fibre channel (FC) protocol, as an illustrative, non-limiting example, to communicate with the storage system(s) within the SAN. For instance, the host device(s) may use the FC protocol to issue IO to a network device, such as an FC switch, that forwards the IO to the SAN.

In certain implementations, the host device may perform IO using optical communications or signals. For example, one or more optical transceiver modules may be coupled to the one or more HBA ports and used for sending or receiving optical signals to or from a network device, such as an FC switch. One reference example of an optical transceiver module is a small form-factor pluggable (SFP), which is a fibre optic module that can be inserted (or plugged) into a port on the HBA (e.g., HBA port). Additionally, in certain implementations described herein, the host device may include multipath functionality (e.g., MPIO software) that allows the host device to issue IO through multiple HBA ports (including respective optical transceiver modules inserted therein), where each HBA port is representative of an independent path from the host device to the HBA.

One potential issue with using optical transceiver modules is that, in certain scenarios, one or more of the optical transceiver modules can fail, impacting the communication between the host device and the SAN in terms of reduced throughput, increased latency, and reduced communication performance, as illustrative, non-limiting examples. For example, current implementations of an FC driver stack within a host device may involve issuing IO (or an IO operation) to the HBA via an available path and waiting for a predefined duration of time (e.g., 30 seconds or some other amount of time) to complete the IO. If the issued IO is not completed within the predefined duration of time, the FC driver may send an indication of an IO failure to the MPIO software within the host device. In response to the IO failure indication, the MPIO software may then retry the same IO on an alternative available path.

However, retrying the IO operation via alternate paths using these aforementioned steps can result in the IO operation incurring a penalty in terms of increased latency, which can degrade the communication performance of the host device. Moreover, the degradation in communication performance may be further aggravated in virtual host environments, where multiple host devices (e.g., virtual machines (VMs)) may use the same HBA. In such environments, a physical HBA port may be mapped to multiple host devices.

To address this, certain embodiments described herein provide techniques that allow the host device to predict the potential failure of an optical transceiver module by enabling the host device to monitor the health of the optical transceiver module. For example, in certain embodiments, the host device may monitor the health of an optical transceiver module by monitoring one or more parameters of the optical transceiver module, such as temperature, voltage, transmit (TX) bias, TX power, and receive (RX) power, as illustrative, non-limiting examples. In certain embodiments, when the host device determines that one or more of the optical transceiver module's parameters exceeds a respective predefined threshold value for that parameter, the host device may predict (e.g., determine that there is a threshold likelihood) that the optical transceiver module will fail, causing IO failure on that particular path. In response to predicting that the optical transceiver module will fail, the host device may perform a proactive failover of the IO operation to another available path, avoiding costly IO penalties associated with performing multiple IO retries.

Advantageously, the embodiments described herein for performing proactive IO failover based on monitoring the health of an optical transceiver module on a host HBA may improve the communication performance of the host device in terms of increased throughput and decreased latency, as illustrative, non-limiting examples.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
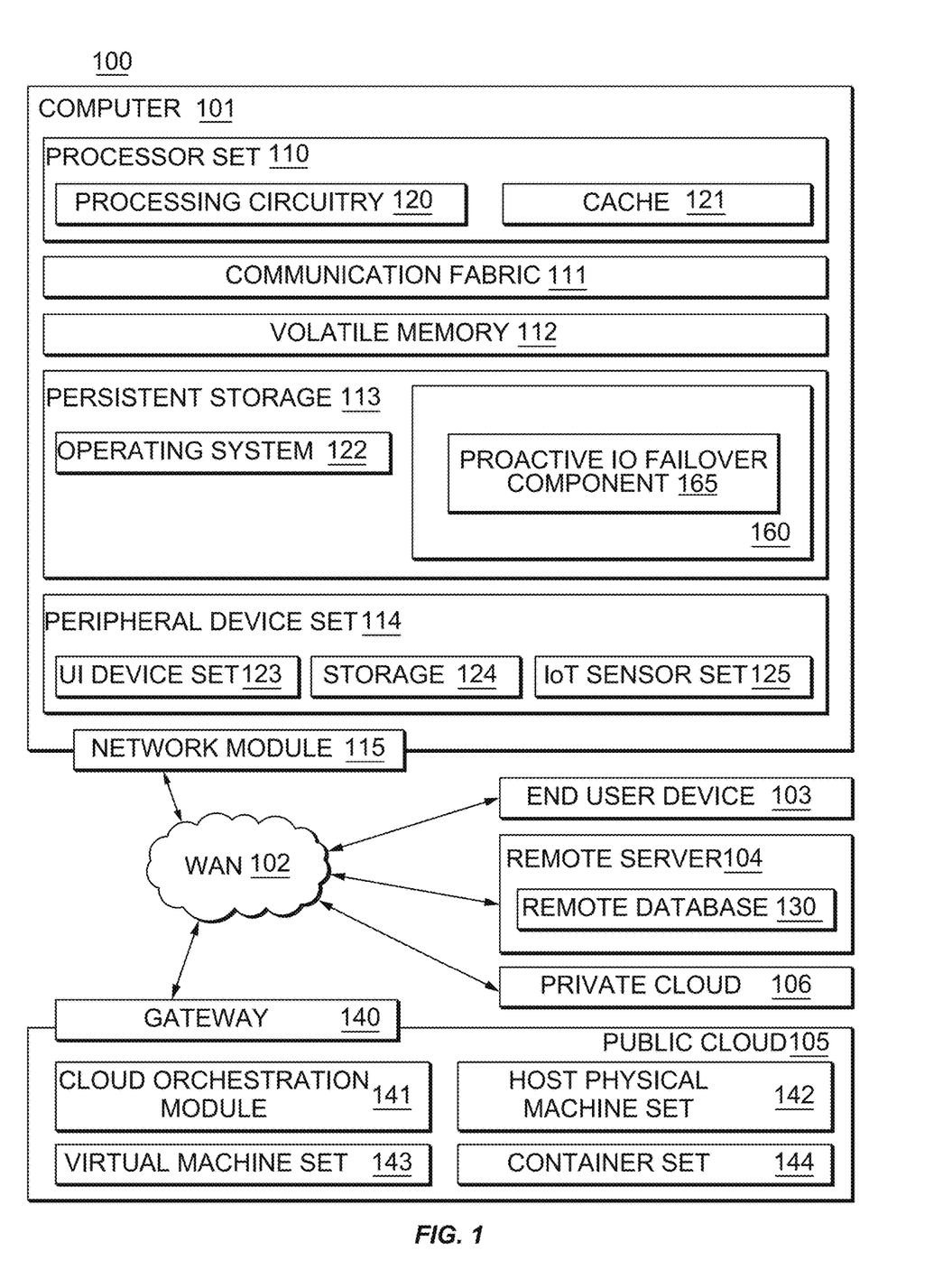
FIG. 1 is a block diagram of a computing environment, according to one embodiment.

Computing environment 100 contains an example of an environment for the execution of at least some of the computer code involved in performing the inventive methods, such as block 160, which includes proactive IO failover component 165 configured to perform proactive IO failover based on monitoring health of one or more optical transceiver modules of a host HBA. In addition to block 160, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 160, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 160 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 160 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Note, to clearly point out novel features of the present invention, the following discussion omits or only briefly describes conventional features of data processing systems which are apparent to those skilled in the art. It may be noted that a numbered element is numbered according to the figure in which the element is introduced, and is referred to by that number throughout succeeding figures. Additionally, as used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

Figure 2:
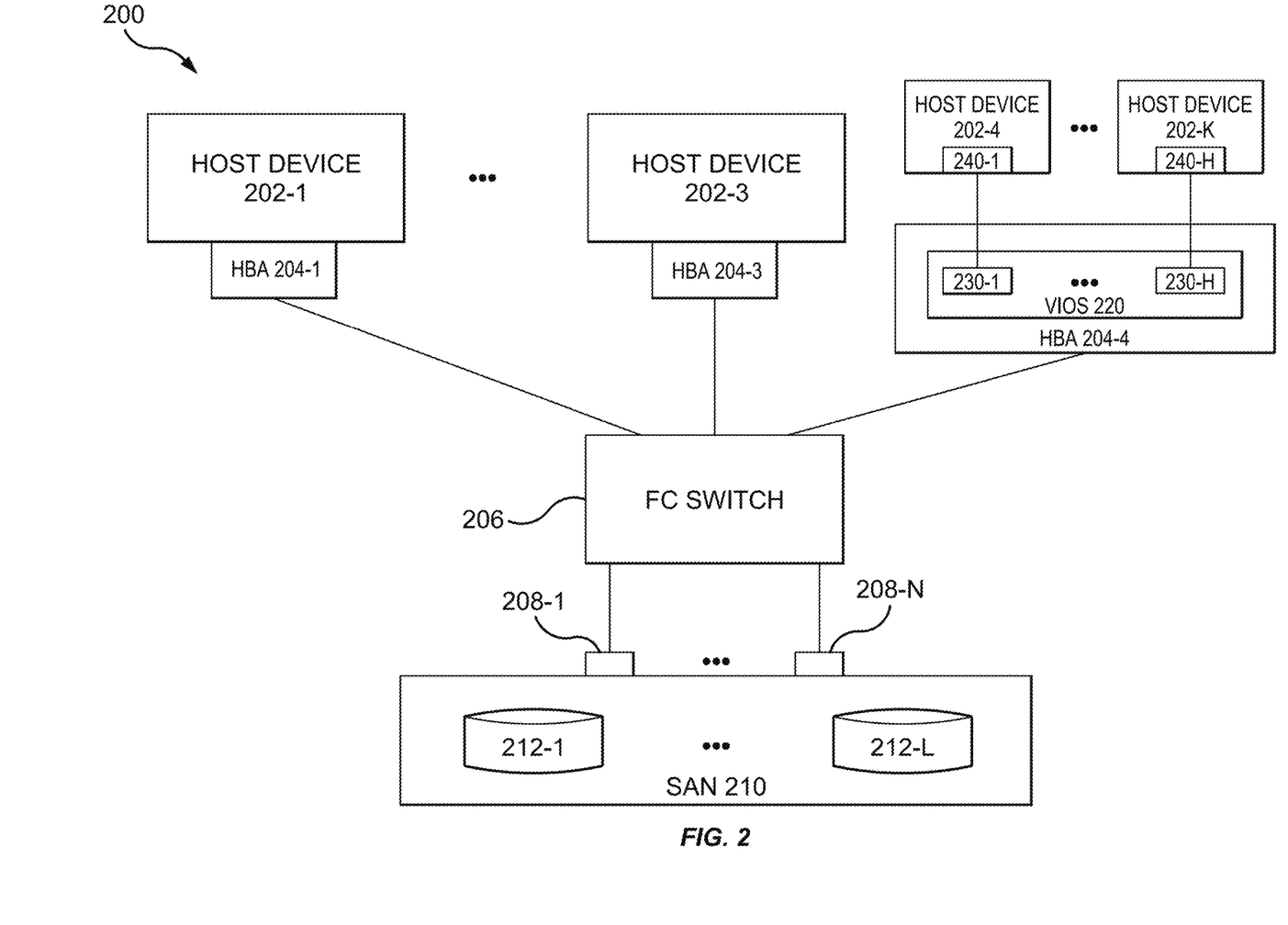
FIG. 2 illustrates an example information processing system, according to one embodiment.

FIG. 2 is a diagram of an example information processing system 200 (hereinafter "system 200"), according to one embodiment. The features described with respect to the system 200 may be used in conjunction with other embodiments described herein. For example, the system 200 may be implemented within the computing environment 100 depicted in FIG. 1. For instance, the system 200 may represent one example implementation of the computer 101 in FIG. 1. In another example, the system 200 may form at least a portion of a datacenter. However, other implementations of the system 200 are also contemplated.

As shown, the system 200 includes, without limitation, one or more host devices 202-1 to 202-K, one or more HBAs 204-1 to 204-4, an FC switch 206, and a SAN 210. The host devices 202 are generally representative of computers, servers, or other types of processing devices capable of communicating with the SAN 210. Each host device 202 may provide compute services (e.g., processors, memory, storage, or any combination thereof) for running one or more applications for one or more users.

In certain embodiments, one or more of the host devices 202 may be implemented using virtual resources, such as VMs, containers, or combinations thereof (e.g., containers configured to run on VMs). In FIG. 2, for example, host devices 202-4 to 202-K may be implemented as VMs that are mapped to the same HBA 204-4 (including same one or more HBA ports). In the depicted example, one or more ports of HBA 204-4 may be assigned to a virtual IO server (VIOS) 220 and mapped to multiple VMs (e.g., host devices 202-4 to 202-K) through virtualization technology, such as N-Port ID virtualization (NPIV). The VIOS 220 may provide respective connections between the virtual fibre channel (VFC) adapters 230 1-H on the VIOS 220 and the VFC adapters 240 1-H on the VMs. For example, VFC adapter 230-1 is connected to VFC adapter 240-1 via the VIOS 220, VFC adapter 230-2 is connected to VFC adapter 240-2 via the VIOS 220, and so on. Note, VFC adapters 230 and 240 along with the VIOS 220 may support NPIV.

The SAN 210 includes one or more storage systems (or storage devices) 212-1 to 212-L. Each storage system 212 is generally representative of any storage device, including, for example, logical volumes (e.g. local units (LUNs), database(s), raid storage, optical storage, and tape storage, as illustrative, non-limiting examples. Each storage system 212 may be configured to store data associated with one or more applications running on one or more of the host devices 202.

Each host device 202 may use a HBA 204 to communicate with the storage system(s) 212 of the SAN 210 via the FC switch 206. Here, for example, host devices 202-1 to 202-3 may use respective HBAs 204-1 to 204-3 to communicate with the SAN 210 via the FC switch 206, and host devices 202-4 to 202-K may use HBA 204-4 to communicate with the SAN 210 via the FC switch 206. Each HBA 204 may include one or more HBA ports, each of which is configured to enable communication between the associated host device and the SAN 210 or another device via the FC switch 206. The FC switch 206 is generally representative of a network device that provides connectivity between end devices, such as hosts and storage. For example, the FC switch 206 may be used as an interconnecting (or intermediary) device between end devices. Although a single FC switch 206 is depicted in the system 200, one or more FC switches may be communicatively coupled together to form a single common fabric.

In certain implementations, a given host device 202 may issue an IO (or IO operation) to an HBA 204 associated with the host device 202. The HBA 204 may send the IO to the FC switch 206, which may forward the IO to the SAN 210 via one of the SAN ports 208-1 to 208-N. In certain embodiments, the HBA 204 may send the IO to the FC switch 206 via an optical transceiver module (e.g., SFP) coupled to the HBA 204. The system 200 may support a transport protocol, such as FC, to communicate data (including IO) between the host devices 202 and SAN 210. The IO (or IO operation) may include one or more commands, such as read commands, write commands, and other types of commands. Such commands may be sent in accordance with an upper-level protocol for FC, such as fibre channel protocol (FCP) and fibre connection (FICON), as illustrative, non-limiting examples.

In certain embodiments described in greater detail herein, one or more of the host devices 202 may include logic (e.g., proactive IO failover component 165) that enables the host device 202 to predict whether an optical transceiver module coupled to the HBA 204 has a likelihood (e.g., greater than a threshold likelihood) of failing, e.g., based on monitoring one or more parameters indicative of the health of the optical transceiver module. In response to predicting that the optical transceiver module will fail, the host device 202 can perform proactive failover of the IO to another alternative path (e.g., another HBA port) within the HBA 204.

Figure 3:
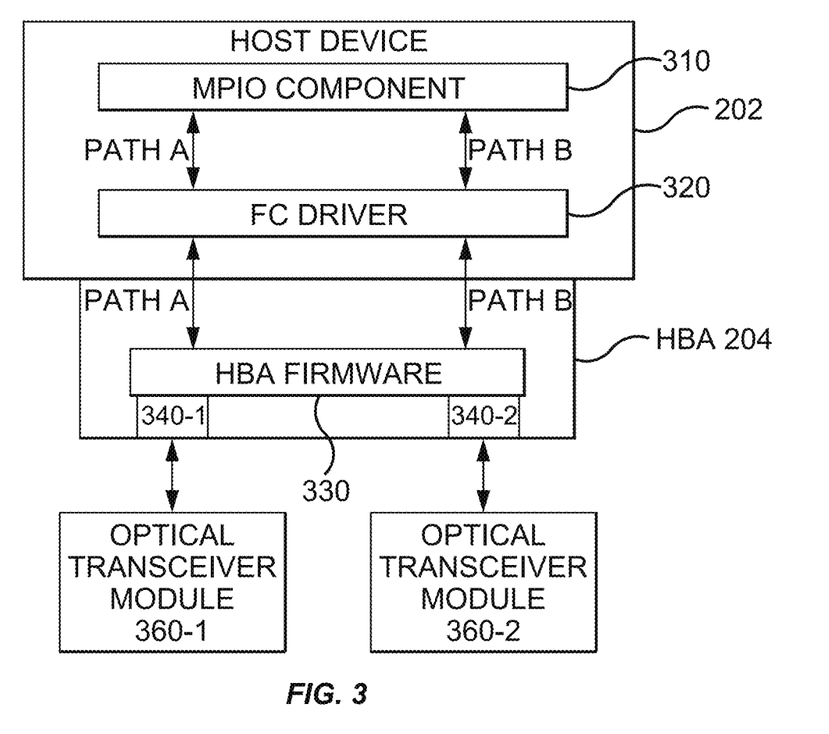
FIG. 3 further illustrates certain components of the information processing system illustrated in FIG. 2, according to one embodiment.

FIG. 3 further illustrates certain components of the information processing system 200, illustrated in FIG. 2, according to one embodiment. In particular, FIG. 3 further illustrates certain components of a host device 202 and HBA 204 described in FIG. 2. As shown, the host device 202 includes an MPIO component 310 and an FC driver 320. As also shown, the HBA 204 includes an HBA firmware 330 and one or more HBA ports 340-1 to 340-2.

As noted, in certain embodiments, the host device 202 may have multiple IO paths to the SAN 210 via the HBA 204. Here, for example, the host device 202 has two independent IO paths, path A and path B, to the SAN 210. Path A is a path from the host device 202 to a first HBA port 204-1 of the HBA 204, and path B is another path from the host device 202 to a second HBA port 204-2 of the HBA 204. Each HBA port 204-1 to 204-2 may have a respective optical transceiver module 360-1 to 360-2 inserted therein (or otherwise coupled to the HBA port). In the depicted embodiment in FIG. 3, each optical transceiver module 360 is implemented with an SFP.

The MPIO component 310 is generally configured to implement multipath functionality for the host device 202. For example, the MPIO component 310 can issue IO through HBA port 340-1 (path A) or through HBA port 340-2 (path B). In certain embodiments described herein, the MPIO component 310 may proactively issue an IO operation over an alternate path upon receiving an indication from the HBA 204 that an existing path used for IO is predicted to fail.

The FC driver 320 is generally configured to implement the host FC stack for issuing IO operations. In certain embodiments described herein, the FC driver 320 may interact with the HBA 204 to register the host device 202 to receive notifications of predictive failure of one or more optical transceiver modules 360 coupled to the HBA 204. For example, in one embodiment, the FC driver 320 may issue an "SFP_PARAM_EVENT" information element (e.g., mailbox command) to the HBA firmware 330 within HBA 204 to register for receiving notifications of predictive failure of the optical transceiver module(s) 360.

Note that FIG. 3 depicts a reference example configuration of a host device 202 and HBA 204 and that other configurations or architectures consistent with the functionality described herein are contemplated. For example, while FIG. 3 depicts the host device 202 as separate from the HBA 204, in certain embodiments, the HBA 204 may be implemented as part of the host device 202.

Figure 4:
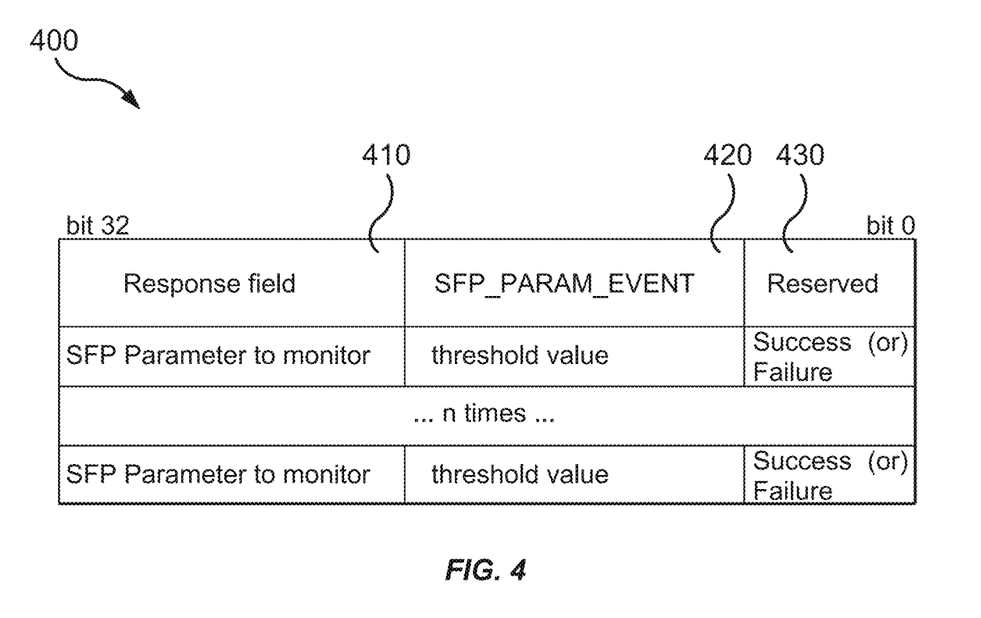
FIG. 4 illustrates an example format of an information element for registering for SFP failure notifications, according to one embodiment.

FIG. 4 illustrates an example format 400 of an "SFP_PARAM_EVENT" information element, according to one embodiment. As shown, the format 400 includes, without limitation, a response field 410, an event field 420, and a reserved field 430. The response field 410 may include an indication of the diagnostic parameter to monitor. As noted, the diagnostic parameters of the optical transceiver module may include temperature, voltage, TX bias, TX power, and RX power, as illustrative, non-limiting examples. In some cases, the diagnostic parameters may be obtained from a specification or standard associated with the optical transceiver module, such as the Small Form Factor (SFF) specification for Management Interface for SFP/SFP+.

The event field 420 may indicate the threshold value for the respective parameter indicated in the response field 410 that triggers notification of a predictive failure of the optical transceiver module. For example, when the respective parameter crosses the defined threshold value, there may be a high likelihood of the optical transceiver module failing, impacting the connectivity of the HBA with the rest of the network and causing an IO failure on that particular path. The threshold values included within the event field 420 may be obtained from a standard or specification associated with the optical transceiver module, such as the SFF specification for Management Interface for SFP/SFP+.

The reserved field 430 may be used to indicate whether the registration was successful or whether a failure occurred. Note that the FC driver 320 may include any number of response fields 410, event fields 420, and reserved fields 430 within the "SFP_PARAM_EVENT" information element to register for notifications of any number of optical transceiver module notifications.

Figure 5:
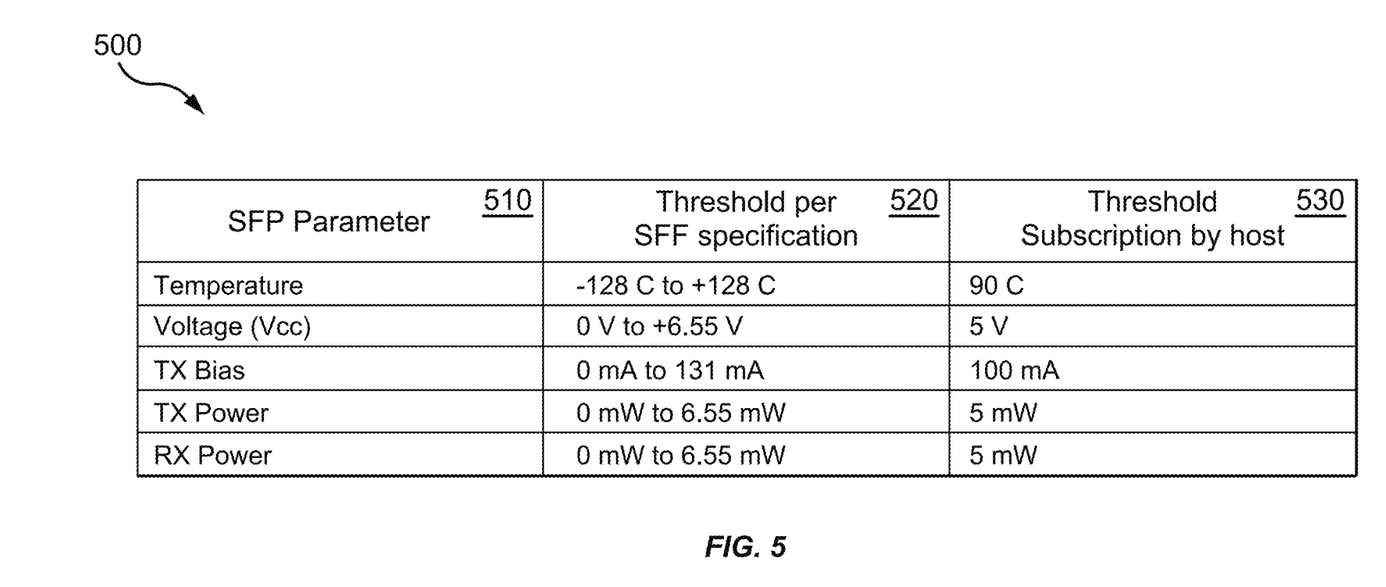
FIG. 5 depicts a table of example diagnostic parameters of an optical transceiver module, according to one embodiment.

Briefly referring to FIG. 5, table 500 in FIG. 5 includes an example set of diagnostic parameters and their respective threshold values that the FC driver 320 can register for receiving failure notifications thereof using the "SFP_PARAM_EVENT" information element. As shown in table 500, for each diagnostic parameter 510, the table 500 indicates a threshold range 520 associated with normal operation (obtained by a standard or specification), and a threshold value 530 that is subscribed to by the host device.

Referring back to FIG. 3, after the FC driver 320 registers with the HBA firmware 330, the HBA firmware 330 may monitor the registered diagnostic parameters and send notifications to the FC driver 320 when a registered diagnostic parameter meets the host subscribed threshold value. Upon receiving such a notification, the FC driver 320 may fail (or flush) the IO(s) that are pending in the FC driver stack (e.g., IO(s) that have not yet issued to the HBA firmware 330), and may send a notification of predictive path failure to the MPIO component 310. The MPIO component 310 may retry the flushed IO(s) and any subsequent IO(s) to an available alternative path.

In certain embodiments, in virtual environments where the HBA port 340 (e.g., port of HBA 204-4) is assigned to a VIOS (e.g., VIOS 220) and mapped to multiple VMs (e.g., host devices 202-4 to 202-K) through virtualization technology, such as NPIV, the FC driver 320 may register on behalf of all VMs and communicate the notification of predictive path failure to all VMs.

Figure 6:
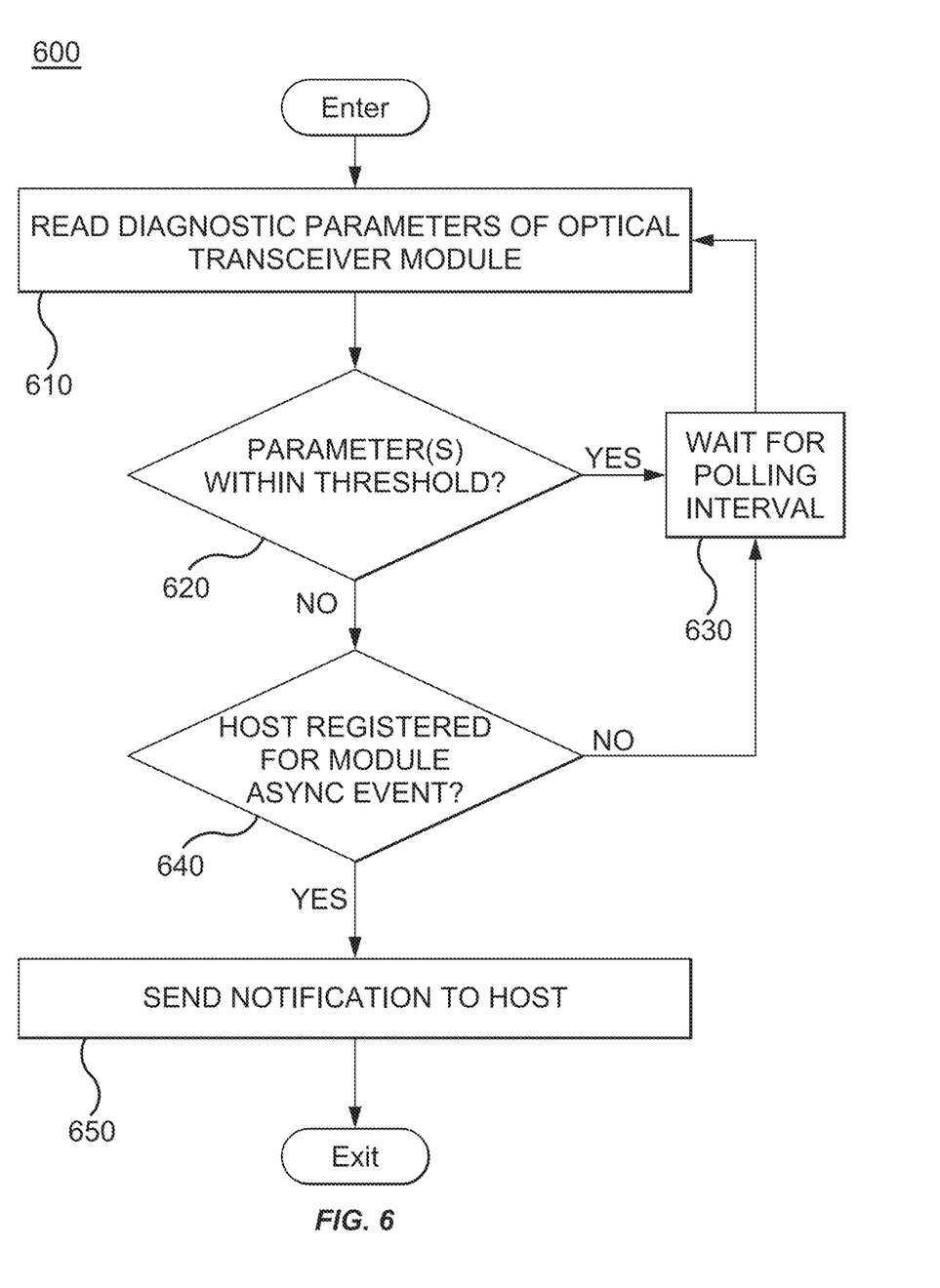
FIG. 6 is a flowchart of a method for performing proactive IO failover in an information processing system, according to one embodiment.

FIG. 6 is a flowchart illustrating a method 600 for performing proactive IO failover in an information processing system, according to one embodiment. The method 600 may be performed by an HBA (e.g., HBA 204) (including one or more components thereof).

Method 600 may enter at block 610, where the HBA reads one or more diagnostic parameters (e.g., parameters 510) of an optical transceiver module (e.g., optical transceiver module 360). The diagnostic parameters that are read by the HBA may be parameters that a host device (e.g., host device 202) has registered to receive notifications for with a mailbox command, such as the "SFP_PARAM_EVENT" information element indicated in FIG. 4.

At block 620, the HBA determines whether each of the parameters is within a respective threshold value associated with the parameter. If so, then the method 600 proceeds to block 630. If not, then the method 600 proceeds to block 640.

At block 630, the HBA waits for a predefined polling interval. After the polling interval has elapsed, the method 600 proceeds to block 610. At block 640, the HBA determines whether the host device has registered to receive notifications of predictive path failures. If so, then the method 600 proceeds to block 650. If not, the method 600 proceeds to block 630. At block 650, the HBA sends the notification of predictive path failure to the host device.

Figure 7:
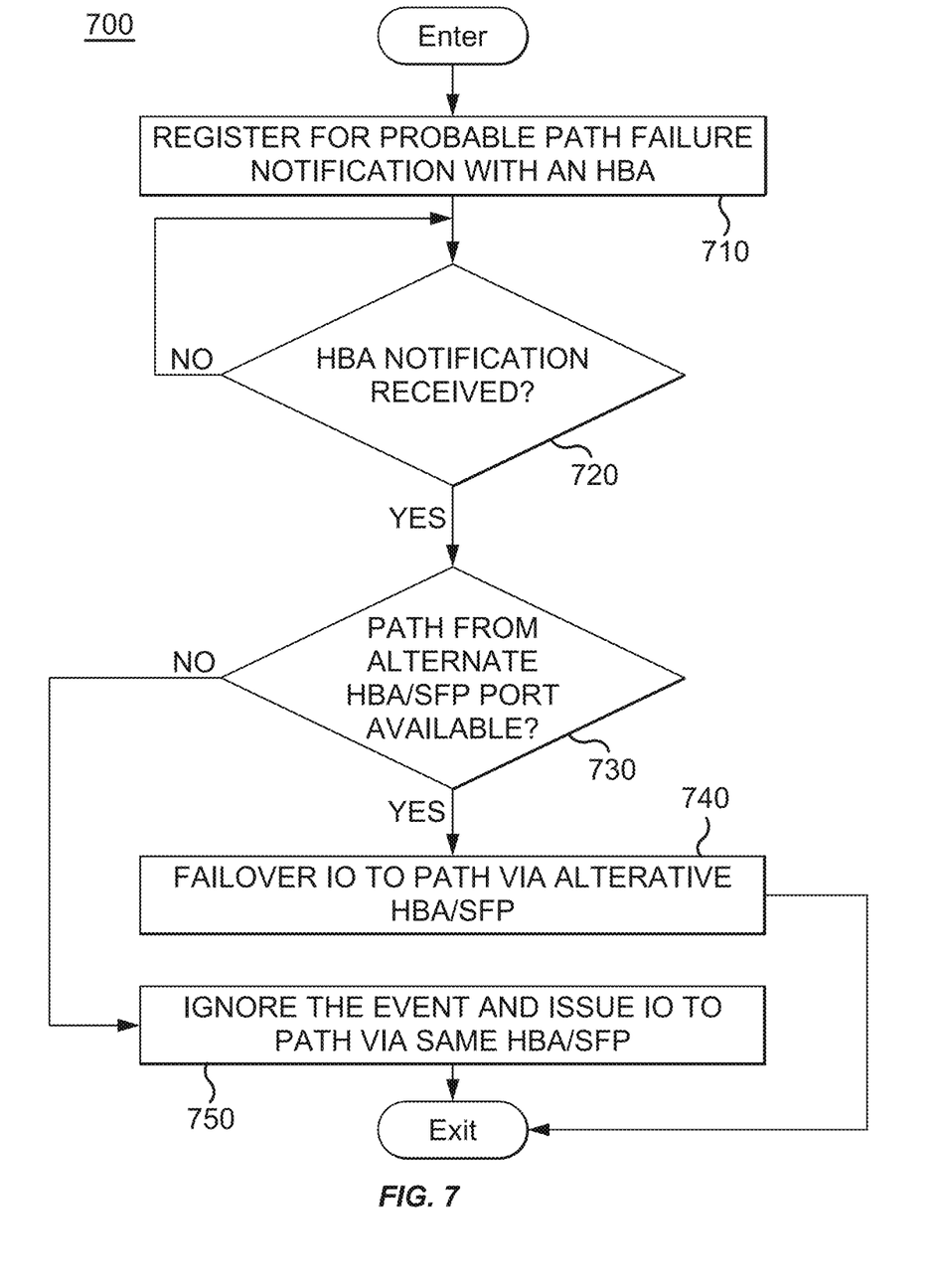
FIG. 7 is another flowchart of a method for performing proactive IO failover in an information processing system, according to one embodiment.

FIG. 7 is a flowchart illustrating a method 700 for performing proactive IO failover in an information processing system, according to one embodiment. The method 700 may be performed by a host device (e.g., host device 202) (including one or more components thereof).

Method 700 may enter at block 710, where the host device registers for probable path failure notifications with an HBA (e.g., HBA 204). For example, as noted, the host device may issue a mailbox command, such as the "SFP_PARAM_EVENT" information element indicated in FIG. 4, to the HBA registering to receive notifications when at least one parameter of an optical transceiver module crosses a predefined threshold value for that parameter.

At block 720, the host device determines whether a notification of predictive path failure from the HBA has been received. If not, then the method 700 remains at block 720. If so, then the method 700 proceeds to block 730. At block 730, the host device determines whether a path from an alternative HBA/optical transceiver module port is available. If so, then the method 700 proceeds to block 740. If not, then the method 700 proceeds to block 750.

At block 740, the host device performs a failover of the IO to another path via an alternative HBA/optical transceiver module port. At block 750, the host device ignores the event and issues the IO to the path via the same HBA/optical transceiver module port.

Figure 8:
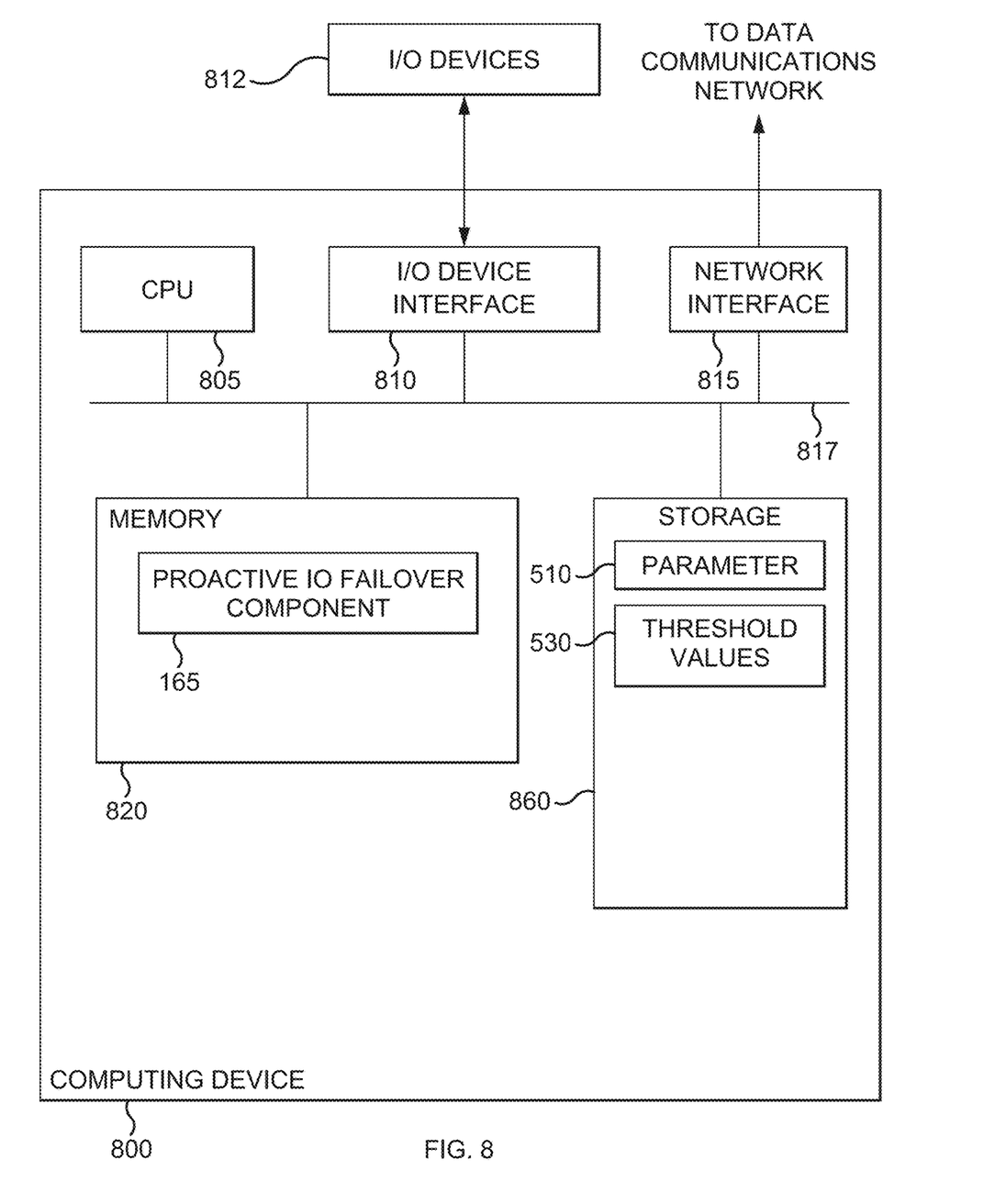
FIG. 8 illustrates an example computing device, according to one embodiment.

FIG. 8 illustrates an example computing device 800 configured to perform proactive IO failover, according to certain embodiments. In certain embodiments, the computing device 800 may be representative of a host device 202, an HBA 204, or a combination thereof. In certain embodiments, the computing device 800 may be configured to perform method 600 illustrated in FIG. 6, method 700 illustrated in FIG. 7, or any other technique or combination of techniques described herein.

As shown, the computing device 800 includes, without limitation, a central processing unit (CPU) 805, a network interface 815, a memory 820, and storage 860, each connected to a bus 817. The computing device 800 may also include an I/O device interface 810 connecting I/O devices 812 (e.g., keyboard, display and mouse devices) to the computing device 800. The computing device 800 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used.

The CPU 805 retrieves and executes programming instructions stored in the memory 820 as well as stored in the storage 860. The bus 817 is used to transmit programming instructions and application data between the CPU 805, I/O device interface 810, storage 860, network interface 815, and memory 820. Note, CPU 805 is included to be representative of a single CPU, multiple CPUs, a single CPU having multiple processing cores, and the like, and the memory 820 is generally included to be representative of a random access memory. The storage 860 may be a disk drive or flash storage device. Although shown as a single unit, the storage 860 may be a combination of fixed and/or removable storage devices, such as fixed disc drives, removable memory cards, optical storage, network attached storage (NAS), or a storage area-network (SAN).

In certain embodiments, the network interface 815 may include an HBA (e.g., HBA 204) (including one or more components thereof), an optical transceiver module (e.g., optical transceiver module 360), or any combination thereof. Illustratively, the memory 820 includes the proactive IO failover component 165, which is discussed in greater detail above. Further, storage 860 includes diagnostic parameters 510 and threshold values 530, which are also discussed in greater detail above.

As used herein, "a processor," "at least one processor," or "one or more processors" generally refer to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refer to a single memory configured to store data and/or instructions or multiple memories configured to collectively store data and/or instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method comprising:
    registering with a host bus adapter (HBA) to receive a notification that a first path via the HBA is predicted to fail, wherein:
        registering with the HBA comprises generating and transmitting an information element to subscribe for the notification that the first path via the HBA is predicted to fail;
        the notification is based on a set of parameters of an optical transceiver module coupled to the first path; and
        the information element comprises (i) the set of parameters and (ii) for each parameter of the set of parameters, a respective threshold value for the parameter that is associated with a likelihood that the optical transceiver module will fail;
    monitoring the set of parameters of the optical transceiver module in accordance with the registration; and
    upon determining, based on the monitoring, that at least one parameter of the set of parameters satisfies a predetermined criteria:
        sending the notification that the first path via the HBA is predicted to fail;
        determining a second path via the HBA for issuing an input-output (IO) operation, the second path being different from the first path; and
        issuing the IO operation via the second path.

2. The computer-implemented method of claim 1, wherein determining that the at least one parameter of the set of parameters satisfies the predetermined criteria comprises determining that the at least one parameter has exceeded the respective threshold value for the at least one parameter.

3. The computer-implemented method of claim 1, wherein the notification is sent to a host device communicatively coupled to the HBA.

4. The computer-implemented method of claim 1, wherein the notification is sent to a plurality of virtual machines (VMs), each of the plurality of VMs being mapped to the first path via the HBA.

5. The computer-implemented method of claim 1, wherein the IO operation is issued via the second path prior to a failure of the first path.

6. The computer-implemented method of claim 1, wherein:
    the first path comprises a first physical port of the HBA; and
    the second path comprises a second physical port of the HBA.

7. The computer-implemented method of claim 1, wherein the set of parameters comprises at least one of a temperature, a voltage, a transmit bias, a transmit power, or a receive power.

8. A computing device comprising:
    one or more memories collectively storing executable instructions; and
    one or more processors communicatively coupled to the one or more memories, the one or more processors being collectively configured to execute the executable instructions and cause the computing device to perform an operation comprising:
        registering with a host bus adapter (HBA) to receive a notification that a first path via the HBA is predicted to fail, wherein;

registering with the HBA comprises generating and transmitting an information element to subscribe for the notification that the first path via the HBA is predicted to fail;

the notification is based on a set of parameters of an optical transceiver module coupled to the first path; and the information element comprises (i) the set of parameters and (ii) for each parameter of the set of parameters, a respective threshold value for the parameter that is associated with a likelihood that the optical transceiver module will fail;

monitoring the set of parameters of the optical transceiver module in accordance with the registration; and upon determining, based on the monitoring, that at least one parameter of the set of parameters satisfies a predetermined criteria:

sending the notification that the first path via the HBA is predicted to fail;

determining a second path via the HBA for issuing an input-output (IO) operation, the second path being different from the first path; and issuing the IO operation via the second path.

9. The computing device of claim 8, wherein determining that the at least one parameter of the set of parameters satisfies the predetermined criteria comprises determining that the at least one parameter has exceeded the respective threshold value for the at least one parameter.

10. The computing device of claim 8, wherein the notification is sent to a host device communicatively coupled to the HBA.

11. The computing device of claim 8, wherein the notification is sent to a plurality of virtual machines (VMs), each of the plurality of VMs being mapped to the first path via the HBA.

12. The computing device of claim 8, wherein the IO operation is issued via the second path prior to a failure of the first path.

13. The computing device of claim 8, wherein:

the first path comprises a first physical port of the HBA; and the second path comprises a second physical port of the HBA.

14. A computer-readable storage medium having computer-readable program code embodied therewith, the computer-readable program code collectively executable by one or more computer processors to perform an operation comprising:

registering with a host bus adapter (HBA) to receive a notification that a first path via the HBA is predicted to fail, wherein:

registering with the HBA comprises generating and transmitting an information element to subscribe for the notification that the first path via the HBA is predicted to fail;

the notification is based on a set of parameters of an optical transceiver module coupled to the first path; and the information element comprises (i) the set of parameters and (ii) for each parameter of the set of parameters, a respective threshold value for the parameter that is associated with a likelihood that the optical transceiver module will fail;

monitoring the set of parameters of the optical transceiver module in accordance with the registration; and upon determining, based on the monitoring, that at least one parameter of the set of parameters satisfies a predetermined criteria:

sending the notification that the first path via the HBA is predicted to fail;

determining a second path via the HBA for issuing an input-output (IO) operation, the second path being different from the first path; and issuing the IO operation via the second path.

15. The computer-readable storage medium of claim 14, wherein determining that the at least one parameter of the set of parameters satisfies the predetermined criteria comprises determining that the at least one parameter has exceeded the respective threshold value for the at least one parameter.

16. The computer-readable storage medium of claim 14, wherein the notification is sent to a host device communicatively coupled to the HBA.

17. The computer-readable storage medium of claim 14, wherein the notification is sent to a plurality of virtual machines (VMs), each of the plurality of VMs being mapped to the first path via the HBA.

18. The computer-readable storage medium of claim 14, wherein the IO operation is issued via the second path prior to a failure of the first path.

19. The computer-readable storage medium of claim 14, wherein:

the first path comprises a first physical port of the HBA; and the second path comprises a second physical port of the HBA.

20. The computer-readable storage medium of claim 14, wherein the set of parameters comprises at least one of a temperature, a voltage, a transmit bias, a transmit power, or a receive power.

* * * * *